May 23, 1944.   J. J. DOMOJ   2,349,251
AIRPLANE SPOTTING AND HANDLING DEVICE
Filed Sept. 18, 1942

INVENTOR
John J. Domoj
BY
ATTORNEY

Patented May 23, 1944

2,349,251

UNITED STATES PATENT OFFICE 2,349,251

AIRPLANE SPOTTING AND HANDLING DEVICE

John Joseph Domoj, United States Navy

Application September 18, 1942, Serial No. 458,916

4 Claims. (Cl. 280—61)

(Granted under the act of March 3, 1883, as amended April 30, 1928; 370 O. G. 757)

This invention relates to devices for facilitating the manual movement of planes between the hangar and the line from which they are started on their flight or where they are left by the pilots, as well as for handling them in close quarters, as e. g. inside the hangars.

The objects of the present devices are to combine a suitable dolly with means mounted thereon for jacking up the axles of the landing wheels of airplanes, and to make this combination simple in structure, easy to manipulate and efficient in service.

Figure 1:
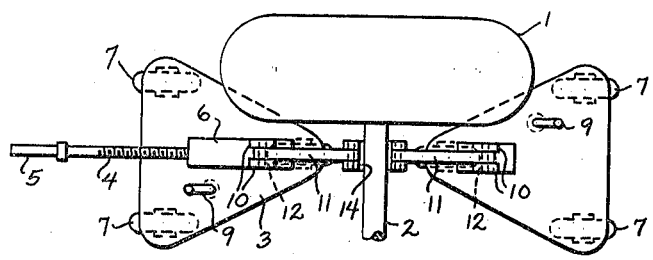
Figure 2:
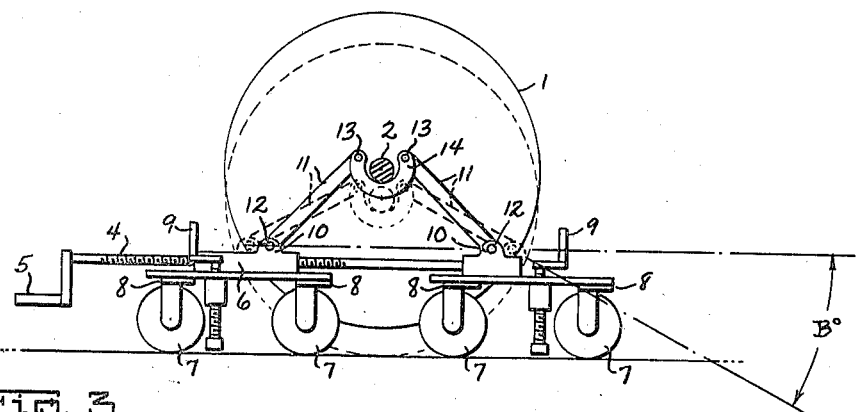
Figure 3:
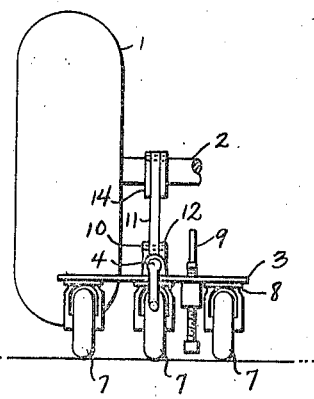

Further objects will become apparent as the detailed description of the present invention proceeds, with reference to the accompanying drawing, in which, Fig. 1 is a plan view of a preferred form of the present device in position under a wheel axle, Fig. 2 is a side view thereof, and Fig. 3 is an end view of the same device.

In the drawing, 1 represents the wheel, 2 the axle and 3 the dolly. In general, the dolly is made up of two similar three-wheeled parts connected by means of the rotatable worm shaft 4 which has a crank 5 at one end thereof and is rotatably anchored at the other end to one of the dolly parts, the worm portion passing through a threaded bushing 6 mounted on the other dolly part. Each of these dolly parts has three rollers or wheels 7 on swivelled mountings 8 and a brake 9 comprising a threaded bushing mounted vertically on the dolly part and a threaded bolt passing therethrough having a brake block at the lower end and an operating handle at the upper end.

There is also a bracket 10 on each dolly part, on which a link 11 is pivotally mounted at 12. The other ends of these links are pivotally connected at 13 to a support 14 which fits under a jack pad on the axle 2.

With the support 14 lowered sufficiently, the dolly is rolled under the axle 2 so that the support is beneath the jack pad on the axle, and worm crank 5 is turned to draw the dolly parts toward each other, drawing the base ends of the links 11 closer and thus elevating the support until it engages the jack pad and lifts the axle so as to raise the wheel off the ground. A similar device is used at the other landing wheel, or one dolly may be used in the center of the axle and the plane may be manually balanced on the support when the plane is to be moved about. The swivelled rollers 7 permit movement of the forward part of the plane in any direction. Meanwhile the tail of the plane may be carried around, or, if mounted on a swivelled tail-wheel, may be pushed around manually as desired.

When it is desired to prevent rolling of the dolly, as in spotting the plane, prior to lowering the jack the brakes may be turned down until the blocks press against the ground or floor, thus preventing accidental movement during the lowering operation.

The device may be so designed that the angle the links make with the horizontal when the support engages the jack pad on axle 2, is aproximately 30 degrees.

Various modifications as to form, dimensions and materials may be made in the design and construction of the present invention without departing from the scope of the appended claims.

The invention may be used by or for the Government of the United States for governmental purposes without the payment to me of any royalty thereon or therefor.

What I claim is:

1. An airplane spotting and handling device comprising a dolly composed of two similar parts joined by means for varying the distance between them, each part having swivelled rollers thereunder, braking means and a bracket, a link pivotally connected to each bracket, the other ends of said links being pivotally connected to a support for jacking up an axle by moving the parts together after placing the support beneath the axle.

2. An assembly composed of two similar parts mounted on swivelled rollers or wheels, a worm shaft joining said parts and being rotatably anchored at one end to one of said parts, its worm portion being threadedly engaged to said other part and the other end of said shaft being furnished with means for turning it, a bracket on each of said parts having a link pivotally connected thereto, a support, the other ends of said links being pivotally connected to said support, whereby the support may be lowered or raised by turning the worm shaft so as to move the parts further apart or closer together respectively, the parts being supplied with brake means.

3. An assembly composed of two similar parts mounted on swivelled rollers or wheels, a worm shaft joining said parts and being rotatably anchored at one end to one of said parts, its worm portion being threadedly engaged to said other part and the other end of said shaft being furnished with means for turning it, a bracket on each of said parts having a link pivotally connected thereto, a support, the other ends of said links being pivotally connected to said support, whereby the support may be lowered or raised by turning the worm shaft so as to move the parts further apart or closer together respectively, the parts being substantially triangular in plan with the apexes directed toward each other.

4. An assembly composed of two similar parts mounted on swivelled rollers or wheels, a worm shaft joining said parts and being rotatably anchored at one end to one of said parts, its worm portion being threadedly engaged to said other part and the other end of said shaft being furnished with means for turning it, a bracket on each of said parts having a link pivotally connected thereto, a support, the other ends of said links being pivotally connected to said support, whereby the support may be lowered or raised by turning the worm shaft so as to move the parts further apart or closer together respectively, the parts being substantially triangular in plan with the apexes directed toward each other and three of the swivelled rollers being used at the corners in each part.

JOHN JOSEPH DOMOJ.